(12) United States Patent
Armstrong et al.

(10) Patent No.: US 7,698,700 B2
(45) Date of Patent: Apr. 13, 2010

(54) SYSTEM QUIESCE FOR CONCURRENT CODE UPDATES

(75) Inventors: William J. Armstrong, Rochester, MN (US); Robert J. Battista, Rochester, MN (US); Christopher Francois, Apple Valley, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 10/418,566

(22) Filed: Apr. 17, 2003

(65) Prior Publication Data

US 2004/0210890 A1    Oct. 21, 2004

(51) Int. Cl.
G06F 9/44    (2006.01)
G06F 9/445    (2006.01)

(52) U.S. Cl. .................... 717/169; 717/175
(58) Field of Classification Search .......... 717/168–174
See application file for complete search history.

(56) References Cited

U.S. PATENT DOCUMENTS

| | | | | |
|---|---|---|---|---|
| 5,359,730 A | * | 10/1994 | Marron | 717/169 |
| 5,410,703 A | * | 4/1995 | Nilsson et al. | 717/168 |
| 5,784,702 A | * | 7/1998 | Greenstein et al. | 711/173 |
| 5,797,004 A | * | 8/1998 | Lindholm et al. | 718/104 |
| 5,931,919 A | * | 8/1999 | Thomas et al. | 719/315 |
| 6,075,938 A | * | 6/2000 | Bugnion et al. | 703/27 |
| 6,101,327 A | * | 8/2000 | Holte-Rost et al. | 717/170 |
| 6,189,145 B1 | * | 2/2001 | Bellin et al. | 717/170 |
| 6,634,025 B1 | * | 10/2003 | Hauptmann et al. | 717/168 |
| 6,698,017 B1 | * | 2/2004 | Adamovits et al. | 717/168 |
| 6,711,605 B2 | * | 3/2004 | Sekiguchi et al. | 718/100 |
| 6,834,340 B2 | * | 12/2004 | Lee et al. | 713/100 |
| 2002/0112102 A1 | * | 8/2002 | Tarui et al. | 710/60 |

OTHER PUBLICATIONS

Alemany, Juan; Felten, Edward W; "Performance Issues in Non-blocking Synchronization on Shared-memory Multiprocessors", p. 125-134, 1992 ACM, retrieved May 12, 2005.*
Herlihy, Maurice; "A Methodology for Implementing Highly Concurrent Data Objects", p. 745-770, 1993 ACM, retrieved May 12, 2005.*
Iftode, Liviu; Blumrich, M; Dubnicki, C; Oppenheimer, D; Singh, JP; Ii, Kai; "Shared Virtual Memory with Automatic Update Support", p. 175-183, 1999 ACM, retrieved May 12, 2005.*
Mitchem, Terrence; Lu, Raymond; O'Brien, Richard; "Using Kernel Hypervisors to Secure Applications", p. 175-181, 1997 IEEE, retrieved May 12, 2005.*

* cited by examiner

*Primary Examiner*—Wei Y Zhen
*Assistant Examiner*—Matthew J Brophy
(74) *Attorney, Agent, or Firm*—Patterson & Sheridan, LLP

(57) ABSTRACT

Methods, systems, and articles of manufacture for allowing an update to an executable component, such as a logical partitioning operating system, running on a computer system without requiring a reboot (or IPL) of the computer system are provided. Processors or tasks executing in a portion of code being updated may be forced to a known or "quiesced" state (e.g., designated wait points) before applying the update. If any of the processors or tasks are not in their quiesced state, the update is not applied or may be rescheduled for a later time, in an effort to allow the system to reach the quiesced state.

21 Claims, 5 Drawing Sheets

SYSTEM QUIESCE FOR CONCURRENT CODE UPDATES

BACKGROUND OF THE INVENTION

1. Field of the Invention

The present invention generally relates to logically partitioned computer systems and more particularly to applying concurrent updates to a logical partitioning operating system.

2. Description of the Related Art

In a computing environment, parallel processing generally refers to performing multiple computing tasks in parallel. Traditionally, parallel processing required multiple computer systems, with the resources of each computer system dedicated to a specific task, or allocated to perform a portion of a common task. However, recent advances in computer hardware and software technologies have resulted in single computer systems capable of highly complex parallel processing, by logically partitioning the system resources to different tasks. In a logically partitioned computer system, available system resources are allocated among multiple logical partitions, each designed to appear to operate independently of the other. Management of the allocation of resources among logical partitions is typically accomplished via a layer of software components, commonly referred to as a partition manager.

An objective of the partition manager is to allow each logical partition to independently run software (e.g., operating systems and operating system-specific applications), typically developed to run on a dedicated computer system, with little or no modification. For example, one logical partition may be running a first operating system, such as IBM's OS/400, a second logical partition may be running a second operating system, such as IBM's AIX, while a third logical partition may be running a third operating system, such as Linux. By providing the ability to run multiple operating systems on the same computer system, a logically partitioned system may provide a user with a greater degree of freedom in choosing application programs best suited to the user's needs with little or no regard to the operating system for which an application program was written.

Like any other layer of software in the system, the partition manager may require updates to fix problems that occur in the field (e.g., at a customer location), or to provide product enhancements (e.g., support of additional features). In some cases, to ensure no component accesses a portion of code as it is being updated, which may result in unpredictable behavior, a developer may require a system initial program load (IPL) to apply the update.

An IPL (also referred to as a system boot) generally refers to the process of taking a system from a powered-off or non-running state to the point of loading operating system specific code. This process could include running various tests on components and, in a multi-processor system all functioning processors would go through the IPL process, which may require a significant amount of time. Considering the fact that a logically partitioned system may include several partitions, requiring a system IPL to apply an update to partition manager code may represent unacceptable downtime for the several partitions. Therefore, it is generally desirable that an update to partition manager code be applied while the system is running (i.e., as a concurrent update).

However, a number of difficulties arise when applying a concurrent update, due to the fact that processors or tasks may be running or "executing in" code that may be replaced by the update. According to a conventional approach, an old copy of the code being updated may be maintained to accommodate processors or tasks that were running in the portion of the code being updated (at the time the update is applied). For example, processors executing in the code to be replaced by the update may be interrupted in order to apply the update. After the concurrent update is complete, the processors may be released to resume execution from their interrupted points in the old copy of the code. As another example, when the update is applied, some tasks that were executing in the code may be blocked on a wait object (e.g., a queue, gate, or semaphore). The blocked task will have saved addresses of code that may be replaced by the update. Therefore, at some point after the concurrent update has been applied, the blocked task will complete its wait and return to executing in the old copy of code.

Thus, a developer designing a concurrent update has to carefully consider the implications of a processor or task executing in the old copy of the code while another processor or task is executing in the updated version of the code. However, a developer may have difficulty in anticipating the number of complex interactions that may occur between different components executing in different versions of the partition manager code. Determining these interactions may require extensive testing and it may be difficult or impossible to recreate some of the complex interactions when testing the concurrent update. As a result, some interactions may be complex enough that they prohibit an update from being applied concurrently.

Accordingly, there is a need for an improved method and system for applying an update to a portion of partition manager code that does not require an IPL.

SUMMARY OF THE INVENTION

The present invention generally is directed to a method, article of manufacture, and system for applying a concurrent update to a logically partitioned operating system.

One embodiment provides a method for applying an update to an executable component while the executable component is running. The method generally includes receiving the update, determining if each task that may be impacted by the update is in an identifiable quiesced state, and applying the update to the executable component only if it is determined that each task that may be impacted by the update is an identifiable quiesced state.

Another embodiment provides a method for applying an update to a logical partitioning operating system while the logical partitioning operating system is running. The method generally includes notifying the logical partitioning operating system the update is available, determining if each task impacted by the update has reached a quiesced state, and applying the update to the logical partitioning operating system only if it is determined each task impacted by the update has reached a quiesced state.

Another embodiment provides a computer-readable medium containing a program for applying an update to an executable component while the executable component is running. When executed by a processor, the program performs operations generally including receiving the update, determining if each task that may be impacted by the update is in an identifiable quiesced state, and applying the update to the executable component only if it is determined that each task that may be impacted by the update is an identifiable quiesced state.

Another embodiment provides a logically partitioned computer system generally including a logical partitioning operating system and a concurrent update manager. The logical partitioning operating system is generally responsible for managing one or more logical partitions. The concurrent update manager is generally configured to receive an update for the logical partitioning operating system, determine whether all tasks impacted by the update are in a quiesced state and, if so, apply the update without reloading the logical partitioning operating system.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a method, system, and article of manufacture for allowing an update to a portion of code running on a system without requiring a reboot (or IPL) of the system. For some embodiments, processors or tasks executing in the code being updated may be forced to a known or "quiesced" state (e.g., designated wait points) before applying the concurrent update. If any of the processors or tasks are not in their quiesced state, the update is not applied or may be rescheduled for a short time later. As used herein, the term quiesced state generally refers to an identifiable state of a processor or task from which it is known the processor or task will not return to executing in a portion of code that is being replaced by the update.

Requiring processors and tasks that may be impacted by an update to reach a quiesced state prior to applying the update may greatly simplify the design and application of the update. Therefore, it may be preferable that the set of tasks that may be executing in the code being updated can be identified prior to applying the update. In other words, tasks that are not impacted by the update do not need to reach a quiesced state. While embodiments of the present invention may be utilized to apply concurrent updates of any type of low level operating system code, to facilitate understanding, the following description will refer to logical partitioning operating system code as a particular, but not limiting, example of the type of code that may be updated utilizing the techniques described herein.

One embodiment of the invention is implemented as a program product for use with a computer system such as, for example, the logically partitioned computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet.

Figure 1:
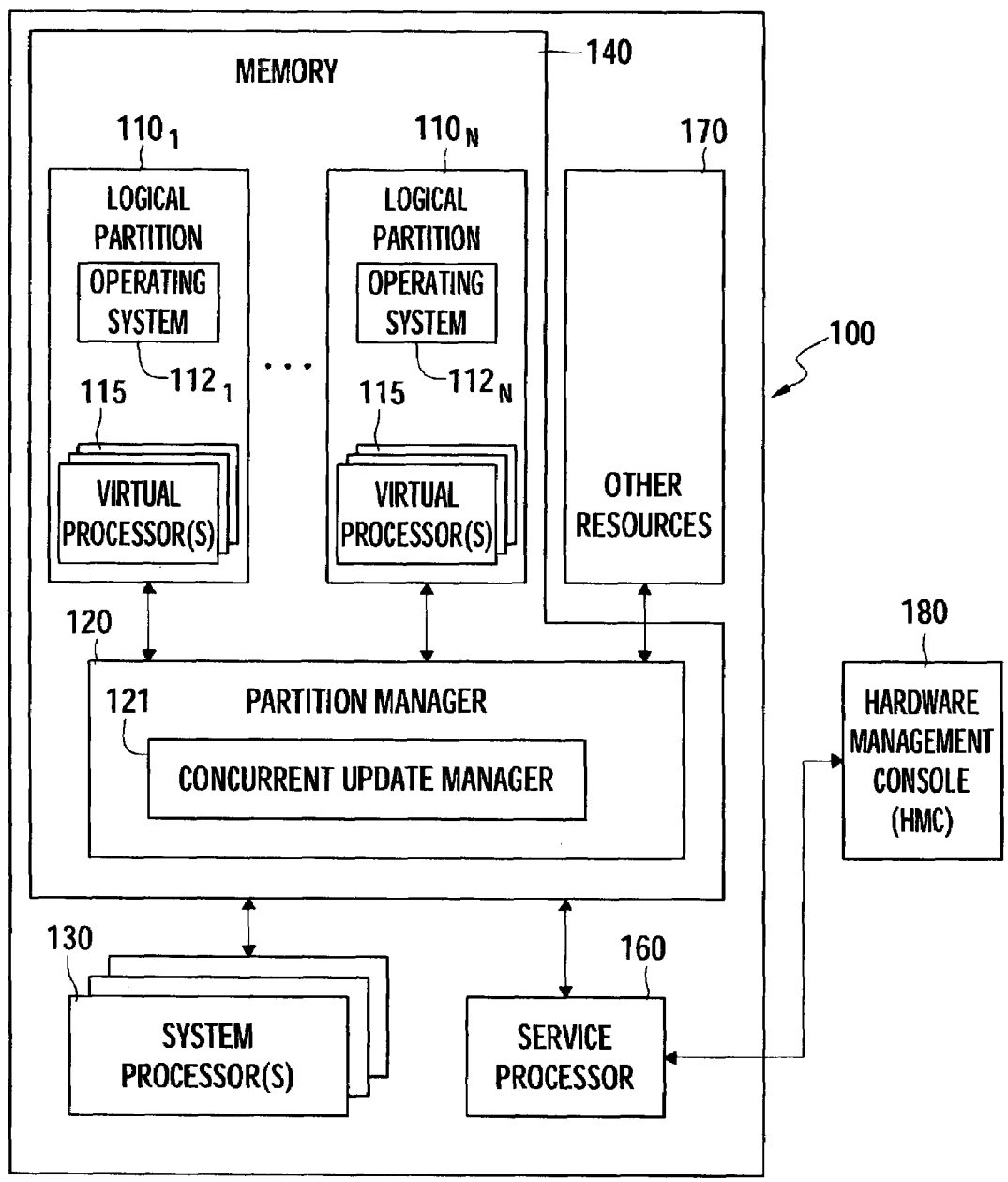
FIG. 1 is a logically partitioned computer system illustratively utilized in accordance with the invention.

In general, the routines executed to implement the embodiments of the invention, may be part of an operating system or a specific application, component, program, module, object, or sequence of instructions, including, for example, firmware embodied as a concurrent update manager 121 component of a partition manager 120 of the logically partitioned computer system 100 shown in FIG. 1. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

An Exemplary Logically Partitioned System

FIG. 1 illustrates a logically partitioned computer system 100 having one or more logical partitions 110 (shown as logical partitions $110_1$ through $110_N$ to represent that any number N of logical partitions 110 may be supported). A partition manager 120 may generally control the creation and deletion of the logical partitions 110. Each logical partition 110 may have an associated operating system 112 running on one or more virtual processors 115 (which may share one or more physical system processors 130). The computer system 100 may be any suitable type of computer system capable of supporting logical partitioning, such as a network server, mainframe computer, and the like. In one embodiment, the computer system 110 is an eServer iSeries computer system available from International Business Machines (IBM) of Armonk, N.Y.

The computer system 100 generally includes one or more (physical) system processors 130, coupled with system memory 140. The system processors 130 may be allocated among the logical partitions 110 according to any suitable allocation arrangement. For example, each logical partition 110 may have its own dedicated one or more of the system processors 130 or may share one or more of the system processors 130 with one or more other logical partitions 110. Each system processor 130 may run one or more of the virtual processors 115 of the logical partitions 110. The allocation of system processors 130, system memory 140, as well as various other resources 170 (e.g., other memory, storage, I/O devices, and the like) among the logical partitions 110 may be controlled by the partition manager 120.

In addition to the system processors 130, the computer system 100 may include a service processor 160, which is generally configured to run continuously and independently of the partition manager 120, including when the partition manager 120 is not running. The service processor 160 typically runs specialized firmware code to run portions of initial program loads (IPLs), which may include component testing. As such, the service processor 160 usually has controlling access to hardware including the ability to start and stop system processors 130 and read fault isolation registers in various components (not shown). The service processor 160 may also be available to help diagnose system problems that may occur during run time. The service processor 160 may be implemented as a microprocessor, such as a PowerPC processor available from IBM, programmed (via internal or external memory) to perform the operations and functions described herein.

The service processor 160 may serve as an interface to the computer system 100 for a hardware console manager (HMC) 180. The HMC 180 may be implemented as a custom configured personal computer (PC) connected to the computer system 100 (typically using the service processor 160 as an interface) and used to configure logical partitioning and other low-level system management. For some embodiments, similar functionality may be provided via one or more service partitions (not shown), or other similar type interfaces, that may also interface with the service processor 160.

Figure 2:
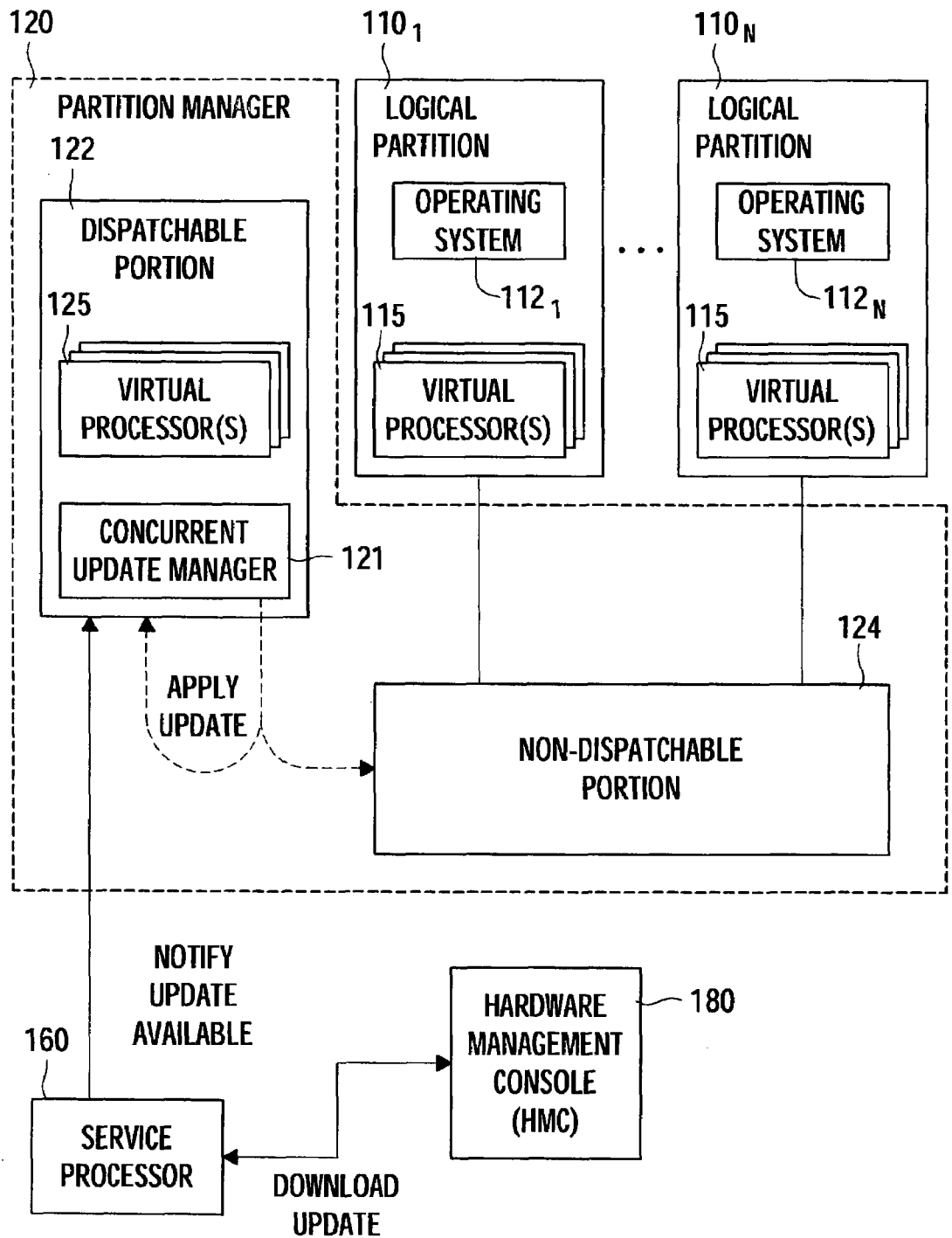
FIG. 2 is a relational view of hardware and software components in accordance with one embodiment of the invention.

FIG. 2 is a relational view of hardware and software components, according to one embodiment of the invention, that may be used to illustrate the application of an update to the partition manager 120. As illustrated in FIG. 2, the partition manager 120 may be implemented as two generally separate layers of code, including a dispatchable portion 122 and a non-dispatchable portion 124.

The non-dispatchable portion 124 is generally implemented as system firmware of the computer system 100, provides low-level partition management functions, such as translation control entry management, page-table management, and contains the data and access methods needed to configure, service, and run multiple logical partitions 110. In contrast, the dispatchable portion 122 has the concept of tasks and generally handles higher-level partition management functions, such as virtual service processor functions, and starting/stopping partitions. As with the logical partitions 110, the dispatchable portion 122 has virtual processors 125 associated with it.

Concurrent Update Application

Figure 3:
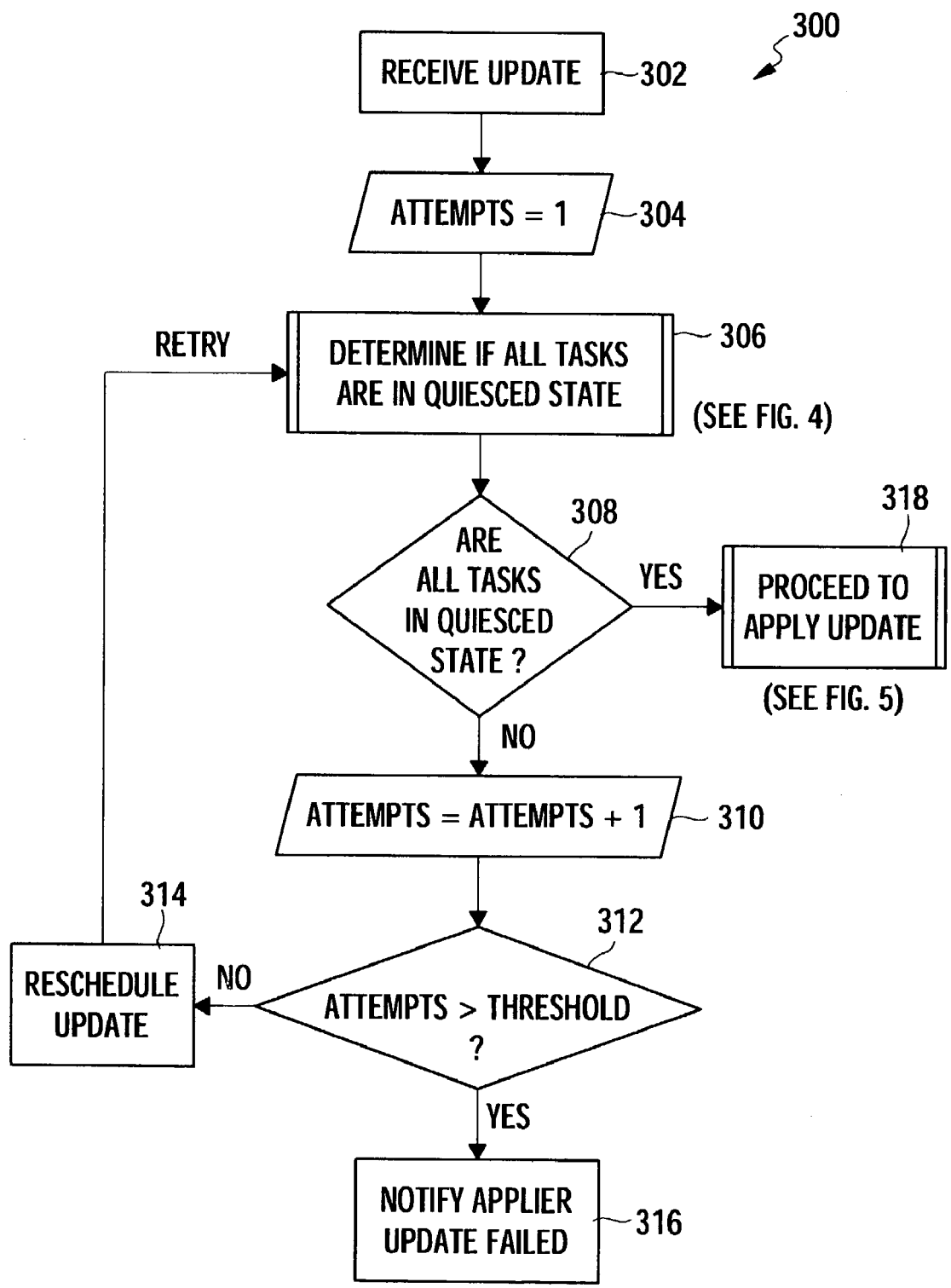
FIG. 3 is a flow chart illustrating exemplary operations for applying a concurrent update that may be performed in accordance with an embodiment of the present invention.

In order to avoid a system IPL, it is equally important that updates for both the dispatchable portion 122 and the non-dispatchable portion 124 of the partition manager be applied concurrently. For some embodiments, updates to both the dispatchable portion 122 and non-dispatchable portion 124 may be coordinated by the concurrent update manager 121. FIG. 3 illustrates exemplary operations 300 that may be performed to apply a concurrent update to either the dispatchable portion 122 or non-dispatchable portion of the partition manager 120. The operations 300 may be described with simultaneous reference to FIG. 2.

The operations 300 begin at step 302, by receiving an update for the partition manager 120. As previously described, the update may be downloaded from the HMC 180 to the service processor 160. As illustrated, the service processor 160 may notify the dispatchable portion 122 of the partition manager 120 that an update is available. In response, the dispatchable portion 122 may invoke the concurrent update manager 121 to coordinate application of the update. In other words, the update manager 121 may be implemented as a task that may be invoked by the dispatchable portion 122 to run on a virtual processor 125 associated therewith. For some embodiments, if the update is not successfully applied on the first attempt, the concurrent update manager 121 may make further attempts, up to a predetermined threshold number of attempts. Therefore, at step 304, a variable used to keep track of the number of attempts is initialized to one.

Figure 4:
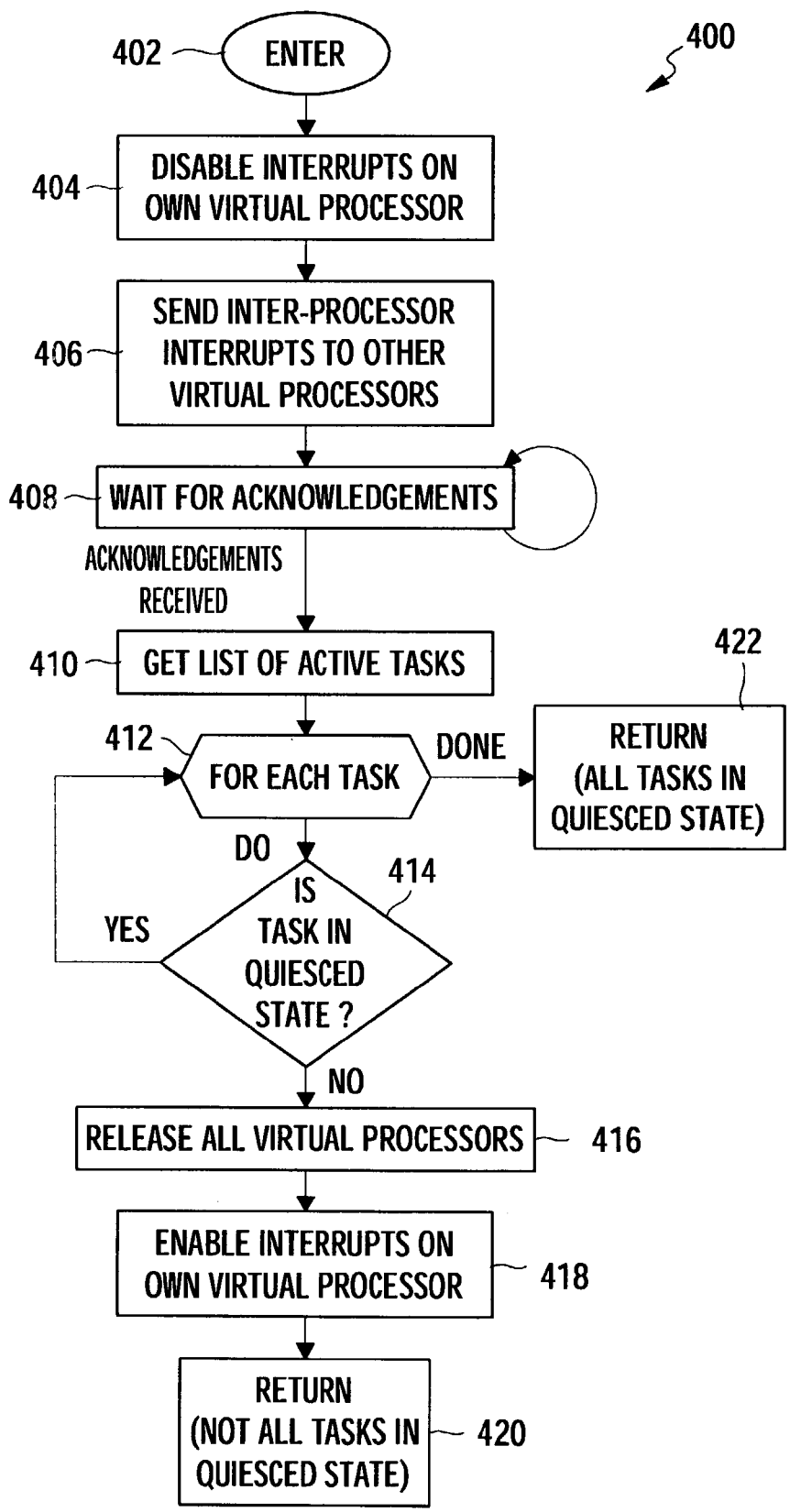
FIG. 4 is a flow chart illustrating exemplary operations that may be performed to determine if a concurrent update may be applied accordance with an embodiment of the present invention.

At step 306, a determination is made as to whether all tasks (e.g., all tasks running in the dispatchable portion 122 that may be impacted by the update) are in a quiesced state. If possible, identifying the tasks that may be impacted by the update at the time the update is developed may greatly simplify its concurrent application, as it may limit the number of tasks that must be quiesced prior to applying the update. For some embodiments, the set of tasks impacted by the update may be provided (e.g., to the concurrent update manager 121) as part of the update. FIG. 4 illustrates exemplary operations 400 that may be performed by the concurrent update manager 121 for determining if all tasks are in the quiesced state, according to one embodiment. For example, the operations 400 may be performed as part of a subroutine that returns an indication as to whether each of the tasks are in the quiesced state.

The operations 400 begin at step 402 and, at step 404, interrupts on the virtual processor 125 running the concurrent update manager 121 are disabled, thus assuring no interrupts will be processed on the concurrent update manager's virtual processor as the update is applied. This guarantees that the task applying the concurrent update cannot be preempted in the act of applying the update. At step 406, inter-processor interrupts (IPIs) are sent to the other virtual processors 125 (e.g., the virtual processors other than the one running the concurrent update manager 121) running on the dispatchable portion 122 of the partition manager 120. At step 408, the concurrent update manager waits for each of the other virtual processors to acknowledge the IPIs.

Each of the other virtual processors 125 are held in an interrupt state (i.e., they will spin on waiting for a location in memory to change its value) after it acknowledges the IPI. The fact that the other virtual processors 125 have acknowledged the IPIs means there cannot be any other "interrupt level" code running on the other virtual processors 125. It also means that the interrupted virtual processor will not execute a task while it is in this interrupted state. Therefore, the concurrent update manager 121 may conclude that none of the other virtual processors 125 will return from another interrupt to a portion of the code that is being replaced by the update.

However, one or more of the other virtual processors 125 may have been executing a task (in the dispatchable portion 122) when interrupted. Thus, it is still possible that a virtual processor 125 may return to a portion of code that is being replaced by the update, which may result unpredictable behavior. In order to detect this, the concurrent update manager 121 may examine the execution status of each task running on the dispatchable portion 122 of the partition manager 120.

At step 410, the update manager 121 gets a list of tasks (e.g., a "task chain") and, at step 412, enters a DO loop to determine the execution status of each task. At step 414, a determination is made to see if a selected task is in its quiesced state For some embodiments, whether a task is blocked at its designated wait object may be one indication of whether the task is in its quiesced state.

For example, for some embodiments, in an effort to facilitate determining whether a task is in its quiesced state, it may be required that, when a task is created, a designated wait object must be specified. In other words, creation of the task may fail if the designated wait object is not specified. A designated wait object may be any number of synchronization objects on which a task may block (e.g., a queue, gate, semaphore, or the like). It may be a further requirement that if a task blocks on its wait object, but not as a result of being in its quiesced state, a bit in a task control block indicates that the task is not in its quiesced state. A task control block is a storage that holds key information about the associated task. There is typically one such control block associated with every task in a system.

If it is determined that each task is in its quiesced state, the operations 400 are exited, at step 422, for example, by providing an indication as such as a return value. Processing may then proceed to apply the update (e.g., as shown in step 318 of FIG. 3). On the other hand, if it is determined that any of the tasks are not in the quiesced state (e.g., the task is not blocked at its designated wait object or is blocked at its designated wait object, but not as a result of being in its quiesced state), there is no guarantee the task will not return to a portion of code that is being replaced by the update and, therefore, the application of the update is terminated. In order to allow the tasks to complete their work and reach their quiesced state (e.g., for a subsequent attempt at applying the update), all virtual processors 125 are released, at step 416 and, at step 418, interrupts on the virtual processor 125 of the concurrent update manager 121 are released. An indication that not all tasks are in their quiesced state is returned, at step 420.

Referring back to FIG. 3, if it was determined that not all tasks are in their quiesced state (i.e., the NO branch of block 308 is taken), the number of attempts is incremented at step 310. If the number of attempts has not exceeded the threshold, as determined at step 312, the update is rescheduled, at step 314. For example, the update may be rescheduled for a relatively short time later, in an effort to allow all the tasks to reach their quiesced state. If the number of attempts has exceeded the threshold (e.g., a task failed to reach its quiesced state), an applier of the update may be notified that the update has failed, at step 316. For some embodiments, rather than specify a threshold number of attempts, a timeout period may be defined, in which all tasks impacted by the update must reach the quiesced state. In either case, the partition manager 120 may provide an indication that the update failed (e.g., if the update was downloaded via the HMC 180, a failure notification may be sent to the HMC 180 via the service processor 160). The applier of the update may then take appropriate action to determine the cause of the failure and implement corrective measures.

Figure 5:
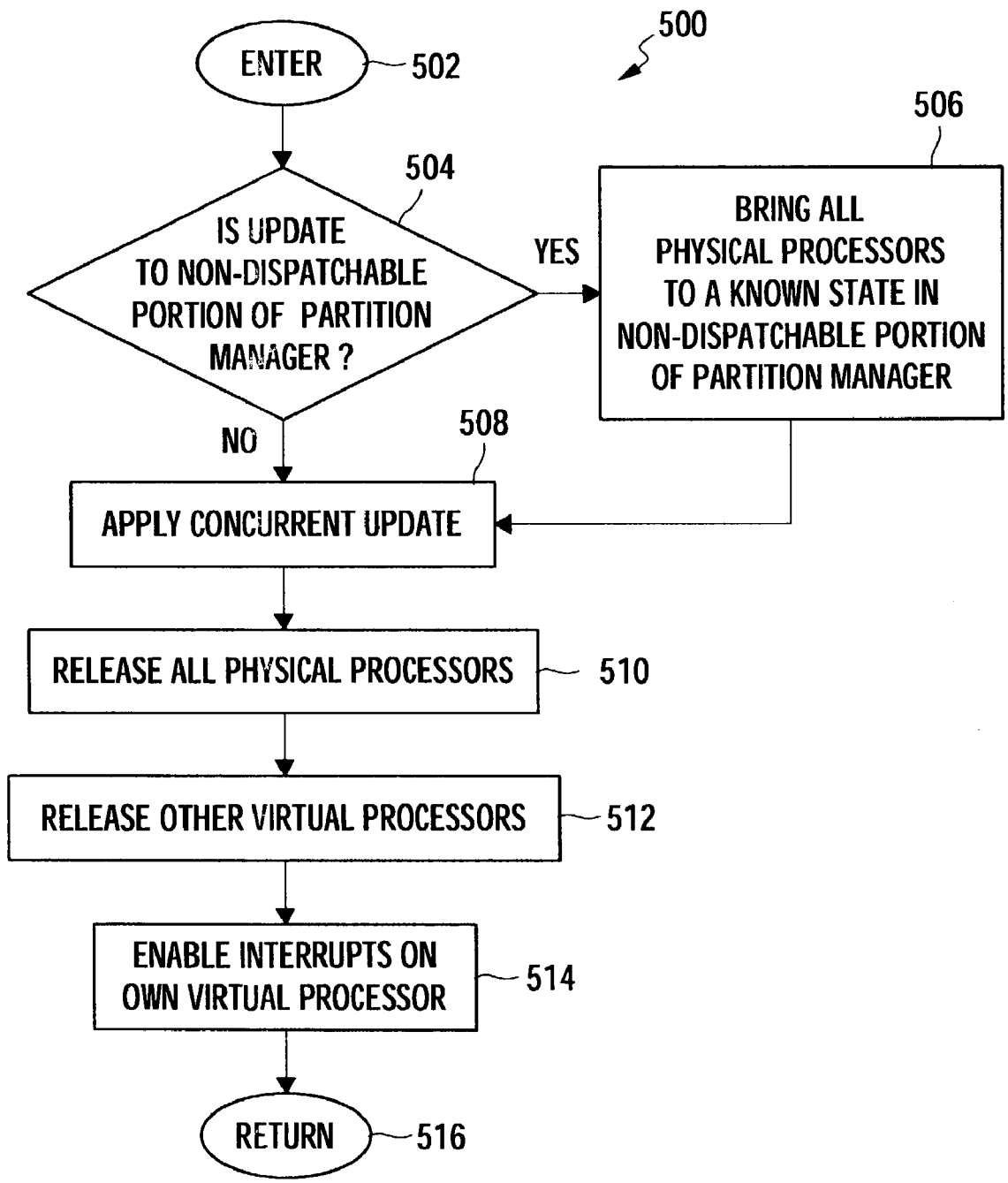
FIG. 5 is a flow chart illustrating exemplary operations that may be performed in response to determining a concurrent update may be applied in accordance with an embodiment of the present invention.

If, on the other hand, all the tasks reach the quiesced state prior to exceeding the threshold number of attempts, the YES branch of block 308 is taken and processing proceeds to step 318 to apply the update. FIG. 5 is a flow diagram illustrating exemplary operations 500 the update manager may perform to actually apply the update, once it has been determined each of the task tasks running on the dispatchable portion of the partition manager have reached their quiesced state. Of course, an update to the partition manager 120 may affect the dispatchable portion 122, the non-dispatchable portion 124, or both. However, the operations 500 assume the update affects at least the dispatchable portion 122 and that the dispatchable portion 122 has reached a quiesced state (e.g., as determined via the operations 400). However, no assumption is made as to whether the update affects the non-dispatchable portion 124.

The operations 500 begin at step 502 and, at step 504, a determination is made as to whether the update is for the non-dispatchable portion 124 of the partition manager 120. While the non-dispatchable portion 124 does not have the concept of tasks, it is still possible that one of the logical partitions 110 is executing in the non-dispatchable portion 124. Therefore, at step 506, in order to ensure none of the processors is executing in code that is being replaced by the update, the concurrent update manager 121 brings all physical processors (i.e., system processors 130), including physical processors that were running virtual processors 125 of the dispatchable portion 122, to a known state in the non-dispatchable portion 124. A physical processor may be brought to a known state by gaining control of the processor through an interrupt generated by a timer associated with the partition manager 120 (there may be one such timer for each processor). The hardware may be designed to ensure the timer will not interrupt the processor when it is executing in the non-dispatchable portion 124 of the partition manager 120 as a result of a call to the partition manager 120. Therefore, when all physical processors reach a quiesced state (they spin waiting for a memory location to change), there should be no processor executing a partition manager call and it should be safe to apply the update.

Having determined that all blocked tasks and processors are in a known (quiesced) state, at step 508, the concurrent update manager 121 applies the update, using any suitable techniques well known in the art or otherwise. At step 510, the concurrent update manager 121 releases all the physical processors (i.e., system processors 130) in the system, to return to the point from which they were interrupted. At step 512, the concurrent update manager 121 releases the other virtual processors 125 (e.g., from their spin in the interrupt handler due to the IPI). The virtual processors 125 may be released by changing the value of a memory location on which all the processors are spinning. It should be noted that the memory location that is used by the virtual processors and physical processors is not the same. Further, the memory location used does not have to be the same for all virtual processors 125 or all of the physical processors.

Of course, if the update did not affect the dispatchable portion 122, the virtual processors 125 may not have been interrupted and step 512 may not be necessary. Similarly, if the update did not affect the non-dispatchable portion 124, the physical processors may not have been interrupted and step 510 may not be necessary. In either case, at step 514, the update manager enables interrupts on its own virtual processor 125. The operations 500 are exited, at step 516, for example, to return to the main update routine of FIG. 3 and notify the applier the update was successful.

CONCLUSION

By ensuring that all tasks and processors are in a quiesced state when a concurrent update is applied, embodiments of the present invention provide a previously unattainable level of assurance that the tasks and processors will execute in the new code after the concurrent update has been applied. By ensuring that all components will not be operating in the updated versions of the code, the complexity, time, and testing involved in the development of a concurrent update (that does not require a system IPL) may be greatly reduced.

While the foregoing is directed to embodiments of the present invention, other and further embodiments of the invention may be devised without departing from the basic scope thereof, and the scope thereof is determined by the claims that follow.

What is claimed is:

1. A method for applying a concurrent update to a logical partitioning operating system while the logical partitioning operating system is running in an environment including a plurality of processors executing a plurality of tasks, comprising:

(a) notifying the logical partitioning operating system the concurrent update is available;
(b) determining if each task impacted by the concurrent update has reached a quiesced state, wherein determining if each task impacted by the concurrent update is in a quiesced state comprises:
  placing one or more virtual processors associated with a dispatchable portion of the logical partitioning operating system in an interrupted state, and
  determining if one or more tasks running in the dispatchable portion of the logical partitioning operating system are blocked on designated wait objects;
(c) determining if each processor is in an identifiable quiesced state; and
(d) applying the concurrent update to the logical partitioning operating system while the logical partitioning operating system is running only if it is determined for all tasks and processors, that each task impacted by the concurrent update has reached a quiesced state and that each processor is in an identifiable quiesced state, so that all the processors and the tasks impacted by the concurrent update remain in the quiesced state during application of the concurrent update, wherein applying the concurrent update to the logical partitioning operating system comprises:
  upon determining that the concurrent update applies to a non-dispatchable portion of the logical partitioning operating system, bringing one or more physical processors to a known state in the non-dispatchable portion of the logical partitioning system prior to applying the concurrent update.

2. The method of claim 1, wherein determining for all tasks, if each task impacted by the concurrent update has reached a quiesced state comprises examining the execution status of each task impacted by the concurrent update.

3. The method of claim 2, wherein determining if each task impacted by the concurrent update is in a quiesced state comprises determining if each task impacted by the concurrent update is at a designated wait object.

4. The method of claim 1, wherein determining if each task impacted by the concurrent update is in a quiesced state further comprises examining a bit in a task control block.

5. The method of claim 1, wherein placing the one or more virtual processors associated with the dispatchable portion of the logical partitioning operating system in an interrupted state comprises sending an inter-processor interrupt to each of the one or more virtual processors.

6. The method of claim 1, further comprising, in response to determining one or more tasks running in the dispatchable portion of the logical partitioning operating system is not blocked on a designated wait object or that a bit in a task control block indicates that one or more of the tasks is not in a quiesced state:
  releasing the one or more virtual processors associated with the dispatchable portion of the logical partitioning operating system from the interrupted state; and
  repeating steps (b) and (c).

7. The method of claim 6, further comprising repeating steps (b) and (c) until the concurrent update is applied, a predetermined timeout period has expired, or the steps (b) and (c) have been repeated a predetermined number of times.

8. A computer-readable storage medium storing a program, which, when executed on a processor, performs an operation for applying a concurrent update to a logical partitioning operating system while the logical partitioning operating system is running in an environment including a plurality of processors executing a plurality of tasks, comprising:

(a) notifying the logical partitioning operating system the concurrent update is available;
(b) determining if each task impacted by the concurrent update has reached a quiesced state, wherein determining if each task impacted by the concurrent update is in a quiesced state comprises:
  placing one or more virtual processors associated with a dispatchable portion of the logical partitioning operating system in an interrupted state, and
  determining if one or more tasks running in the dispatchable portion of the logical partitioning operating system are blocked on designated wait objects;
(c) determining if each processor is in an identifiable quiesced state; and
(d) applying the concurrent update to the logical partitioning operating system while the logical partitioning operating system is running only if it is determined for all tasks and processors, that each task impacted by the concurrent update has reached a quiesced state and that each processor is in an identifiable quiesced state, so that all the processors and the tasks impacted by the concurrent update remain in the quiesced state during application of the concurrent update, wherein applying the concurrent update to the logical partitioning operating system comprises:
  upon determining that the concurrent update applies to a non-dispatchable portion of the logical partitioning operating system, bringing one or more physical processors to a known state in the non-dispatchable portion of the logical partitioning system prior to applying the concurrent update.

9. The computer-readable storage medium of claim 8, wherein determining for all tasks, if each task impacted by the concurrent update has reached a quiesced state comprises examining the execution status of each task impacted by the concurrent update.

10. The computer-readable storage medium of claim 9, wherein determining if each task impacted by the concurrent update is in a quiesced state comprises determining if each task impacted by the concurrent update is at a designated wait object.

11. The computer-readable storage medium of claim 8, wherein determining if each task impacted by the concurrent update is in a quiesced state further comprises examining a bit in a task control block.

12. The computer-readable storage medium of claim 8, wherein placing the one or more virtual processors associated with the dispatchable portion of the logical partitioning operating system in an interrupted state comprises sending an inter-processor interrupt to each of the one or more virtual processors.

13. The computer-readable storage medium of claim 8, wherein the operation further comprises, in response to determining one or more tasks running in the dispatchable portion of the logical partitioning operating system is not blocked on a designated wait object or that a bit in a task control block indicates that one or more of the tasks is not in a quiesced state:
  releasing the one or more virtual processors associated with the dispatchable portion of the logical partitioning operating system from the interrupted state; and
  repeating steps (b) and (c).

14. The computer-readable storage medium of claim 13, wherein the operation further comprises repeating steps (b)

and (c) until the concurrent update is applied, a predetermined timeout period has expired, or the steps (b) and (c) have been repeated a predetermined number of times.

15. A system, comprising:
   a plurality of processors;
   a plurality of logical partitions; and
   a memory storing a logical partitioning operating system, wherein the logical partitioning operating system includes a concurrent update manger application configured to perform an operation for applying a concurrent update to the logical partitioning operating system while the logical partitioning operating system coordinates the execution of a plurality of tasks on the plurality of logical partitions, the operation comprising:
   (a) notifying the logical partitioning operating system the concurrent update is available;
   (b) determining if each task impacted by the concurrent update has reached a quiesced state, wherein determining if each task impacted by the concurrent update is in a quiesced state comprises:
      placing one or more virtual processors associated with a dispatchable portion of the logical partitioning operating system in an interrupted state, and determining if one or more tasks running in the dispatchable portion of the logical partitioning operating system are blocked on designated wait objects;
   (c) determining if each processor is in an identifiable quiesced state; and
   (d) applying the concurrent update to the logical partitioning operating system while the logical partitioning operating system is running only if it is determined for all tasks and processors, that each task impacted by the concurrent update has reached a quiesced state and that each processor is in an identifiable quiesced state, so that all the processors and the tasks impacted by the concurrent update remain in the quiesced state during application of the concurrent update, wherein applying the concurrent update to the logical partitioning operating system comprises:
      upon determining that the concurrent update applies to a non-dispatchable portion of the logical partitioning operating system, bringing one or more physical processors to a known state in the non-dispatchable portion of the logical partitioning system prior to applying the concurrent update.

16. The system of claim 15, wherein determining for all tasks, if each task impacted by the concurrent update has reached a quiesced state comprises examining the execution status of each task impacted by the concurrent update.

17. The system of claim 16, wherein determining if each task impacted by the concurrent update is in a quiesced state comprises determining if each task impacted by the concurrent update is at a designated wait object.

18. The system of claim 15, wherein determining if each task impacted by the concurrent update is in a quiesced state further comprises examining a bit in a task control block.

19. The system of claim 15, wherein placing the one or more virtual processors associated with the dispatchable portion of the logical partitioning operating system in an interrupted state comprises sending an inter-processor interrupt to each of the one or more virtual processors.

20. The system of claim 15, wherein the operation further comprises, in response to determining one or more tasks running in the dispatchable portion of the logical partitioning operating system is not blocked on a designated wait object or that a bit in a task control block indicates that one or more of the tasks is not in a quiesced state:
   releasing the one or more virtual processors associated with the dispatchable portion of the logical partitioning operating system from the interrupted state; and
   repeating steps (b) and (c).

21. The system of claim 20, wherein the operation further comprises repeating steps (b) and (c) until the concurrent update is applied, a predetermined timeout period has expired, or the steps (b) and (c) have been repeated a predetermined number of times.

* * * * *